US006659340B2

(12) United States Patent
Siemens

(10) Patent No.: US 6,659,340 B2
(45) Date of Patent: Dec. 9, 2003

(54) CURRENCY RECEIVING DEVICE AND METHOD

(75) Inventor: John Siemens, Kleinberg (CA)

(73) Assignee: Namsys Inc. (CA)

( * ) Notice: Subject to any disclaimer, the term of this patent is extended or adjusted under 35 U.S.C. 154(b) by 0 days.

(21) Appl. No.: 09/729,283

(22) Filed: Dec. 5, 2000

(65) Prior Publication Data

US 2001/0054643 A1 Dec. 27, 2001

(30) Foreign Application Priority Data

Jun. 23, 2000 (CA) .............................................. 2312275

(51) Int. Cl.$^{7}$ .............................................. G06K 17/60

(52) U.S. Cl. ....................... 235/379; 235/382; 235/486; 902/9; 902/13

(58) Field of Search ................................ 235/379, 486, 235/382; 902/9, 13

(56) References Cited

U.S. PATENT DOCUMENTS

| | | | | | |
|---|---|---|---|---|---|
| 3,107,912 | A | | 10/1963 | Fiehl | 271/88 |
| 4,189,133 | A | | 2/1980 | Arrasmith et al. | 270/61 F |
| 4,577,763 | A | * | 3/1986 | Placke et al. | 209/534 |
| 4,714,029 | A | * | 12/1987 | Idegren et al. | 109/45 |
| 4,744,468 | A | | 5/1988 | Goi et al. | 209/534 |
| 4,754,126 | A | * | 6/1988 | Caldwell | 235/379 |
| 4,992,648 | A | * | 2/1991 | Hutchison | 235/379 |
| 5,161,736 | A | * | 11/1992 | Roccoberton et al. | 232/15 |
| 5,411,249 | A | * | 5/1995 | Zouzoulas | 271/181 |
| 5,412,189 | A | * | 5/1995 | Cragun | 235/379 |
| 5,538,122 | A | | 7/1996 | Siemens | 194/207 |
| 5,553,320 | A | * | 9/1996 | Matsuura et al. | 235/379 |
| 5,975,275 | A | * | 11/1999 | Keith, III et al. | 194/217 |
| 6,067,530 | A | * | 5/2000 | Brooks et al. | 705/30 |
| 6,082,519 | A | * | 7/2000 | Martin et al. | 194/350 |
| 6,128,598 | A | * | 10/2000 | Walker et al. | 705/4 |

FOREIGN PATENT DOCUMENTS

| | | | |
|---|---|---|---|
| EP | 0 307 375 A2 | 6/1988 | G07F/9/06 |
| GB | 2 246 899 A | 4/1991 | G07F/7/00 |
| WO | WO 87/02808 | 5/1987 | G07D/9/00 |
| WO | WO 91/11778 | 9/1991 | G06K/9/00 |

* cited by examiner

*Primary Examiner*—Thien M. Le
*Assistant Examiner*—Seung H Lee
(74) *Attorney, Agent, or Firm*—Vidas, Arrett & Steinkraus

(57) ABSTRACT

A currency receiving device for receiving currency from a user, comprising a safe having a lockable access opening and a transfer slot, a local processor, operatively connected to the safe, the local processor having a user interface to communicate with the user, and being capable of communicating with a remote processor, a currency counter, operatively connected to the safe, to count the currency deposited by the user, and a removable currency receptacle, removably contained within the safe and operatively connected to the currency counter, to receive currency from the currency counter and to store the currency, the removable currency receptacle having a unique identifier, wherein, upon the currency receptacle being installed in the safe, the identifier is correlated with the count of currency deposited by the user.

59 Claims, 11 Drawing Sheets

CURRENCY RECEIVING DEVICE AND METHOD

FIELD OF THE INVENTION

This invention relates to the general field of currency handling equipment, and more particularly to devices capable of accepting deposits of paper currency.

BACKGROUND OF THE INVENTION

Paper currency or cash is still extensively used, particularly in high cash environments such as supermarkets and other large retail stores. However, from the retailer's point of view the use of cash can present problems associated with security and efficient handling. Unlike non-currency financial instruments such as credit cards, debit cards, checks and the like, which are generally integrated from point-of-sale with a computerized banking system, cash must be counted and securely transported to a bank depository before it can be properly credited to its owner's account.

The general procedure is to store cash collected in the course of a business day in a secure local storage device such as a store safe. Safes are well known devices for storing valuables that generally comprise a reinforced container made from a strong steel or concrete, and having a lockable access door with internal or heavily reinforced hinges. The stored cash may then be retrieved from the safe periodically by security personnel, such as armed security guards, and securely transported to the bank depository.

This arrangement, while prevalent, presents several problems. First, a sales clerk will generally need to make a series of deposits into the local safe over the course of a day to avoid the security risk of having too much cash on hand. This requires repeated re-opening the lockable access door. When there are several clerks making deposits it becomes convenient to simply leave the door open. However, this undermines the very purpose of the safe, since the stored currency is not protected from theft, fire, and other hazards unless the door is closed and locked.

Another issue is that the security guards may not arrive to retrieve the cash until the next day, or even later. Further, the stored cash is usually randomly scattered throughout the interior of the safe, and then has to be stuffed into bags and loaded onto an armoured vehicle. Unless this happens to be the guard's last pick-up of the day, there are probably other cash pick-ups from other outlets. The cash may therefore not arrive at the bank until a day or two after it is received from the customer. The delay may be even longer if the armoured vehicle picks up loads for deposit at different institutions. This could impose yet a further intervening step of unloading at a central site, sorting according to eventual destination, and re-loading onto another truck.

A further matter is that while the cash is in transit there is a loss of float interest by the owner. Since the cash has not been credited, it is also not available to help fund current operations. Further, the funds represented by this cash-in-transit may not be accurately known to the owner, thereby compromising the owner's ability to maintain tight financial controls.

Yet another issue is that, notwithstanding the various security measures, while in transit the anonymous nature of the cash makes it a persistent and tempting target for pilferage, misappropriation, and theft. For example, the cash bag may be opened or cut and its contents removed. If a bag has been opened and re-closed, it may be difficult to subsequently identify whether there has been a theft or a loading error. Alternatively, one or more bags may be taken outright and the misappropriation not evident until some time later. Moreover, in all of these cases it would be difficult to determine at which precise point in the circuit from the safe to the bank depository that the misappropriation or theft occurred.

Some of these issues have been partly addressed in U.S. Pat. No. 5,538,122, which discloses a currency receiving device comprising a safe with an attached currency counter and having a currency receiving opening with a retractable cover, to selectively provide access to the interior of the safe. Cash placed for deposit is counted and then passed from the currency counter to the safe through the currency receiving opening. The patent further teaches a removable currency receptacle made of heavy gauge steel, placed in the safe, to receive the currency.

This patent teaches a device that may enable regular deposits to be made into the safe while the main access door is kept closed and locked. The removable receptacle is a more convenient and secure enclosure to use to transport cash from the safe to the bank depository.

However, the retractable cover taught is not an effective means of transferring the currency from the currency counter to the safe, and can result in currency being jammed and the cover not closing properly. This creates an opportunity for unauthorized access to the cash stored in the currency receptacle. Further, if the currency receptacle is not installed the device will still work and undesirably deposit currency loosely into the interior of the safe. Yet another matter is that if the main door of the safe is open, the receptacle may be easily removed and its contents taken. Further, even when the currency receptacle is removed by authorized personnel, it is still vulnerable to access by unauthorized personnel while in transit. This can be a problem since, as noted, the receptacle may pass through several trucks and loading sites before reaching the bank depository. The patent fails to teach any means by which a misappropriation during transit can be identified, or by which the cash may be better integrated into the financial banking system.

As a result, regardless of whether a receptacle is used the cash being transported still represents a valuable asset of largely undetermined value that is essentially floating in space until it reaches the bank depository. Therefore, in contrast to modern electronic payment means such as credit or debit cards, cash continues to be a form of payment that is relatively awkward to collect and record, and is not as efficiently integrated into commercial financial systems.

SUMMARY OF THE INVENTION

What is required is a currency receiving device and method which overcomes these disadvantages. Most particularly, this device should include a removable currency receptacle with a unique identifier, recognizable by the currency receiving device, so that deposit information can be correlated with the particular receptacle receiving the deposit. This information is preferably kept at a remote location or processor, but may also be kept with the currency receptacle itself.

The label or identifier provides a tag through which the physical location and progress of the cash-in-transit can be known, and by which the cash contents itself may be effectively tied into the financial system. In this way the cash may be accurately known to its owner from the time it is first deposited in the safe until it is physically deposited at the owner's bank. This should assist the owner in maintaining accurate financial controls, and may even enable early crediting of the owner's bank account, thereby reducing the float expense.

The receptacle should also have a lockable lid to deter unauthorized access while it is in transit. Further, it would be advantageous for the currency receiving device to have a lockable mounting device to securely hold the currency receptacle when it is installed in the safe, to prevent unauthorized removal of the receptacle or its contents and to provide for more efficient operation. The currency receiving device should recognize the presence of the receptacle so that currency will not be transferred unless the receptacle is securely in place. Finally, it would be advantageous to have a retractable cover or access gate to ensure that the deposited currency is quickly, securely, and reliably transferred from the currency counter to the receptacle.

Accordingly, there is provided a currency receiving device for receiving currency from a user, comprising:

a safe having a lockable access opening and a transfer slot;

a local processor, operatively connected to said safe, said local processor having a user interface to communicate with the user, and being capable of communicating with a remote processor;

a currency counter, operatively connected to said safe, to count the currency deposited by the user; and a removable currency receptacle, contained within said safe and operatively connected to said currency counter, to receive currency from the currency counter and to store said currency, said removable currency receptacle having a unique identifier;

wherein, upon said currency receptacle being installed in said safe, said identifier is correlated with said count of currency deposited by said user.

BRIEF DESCRIPTION OF THE DRAWINGS

Reference will now be made, by way of example only, to preferred embodiments of the invention as illustrated in the attached figures.

DETAILED DESCRIPTION OF THE PREFERRED EMBODIMENTS

Figure 1:
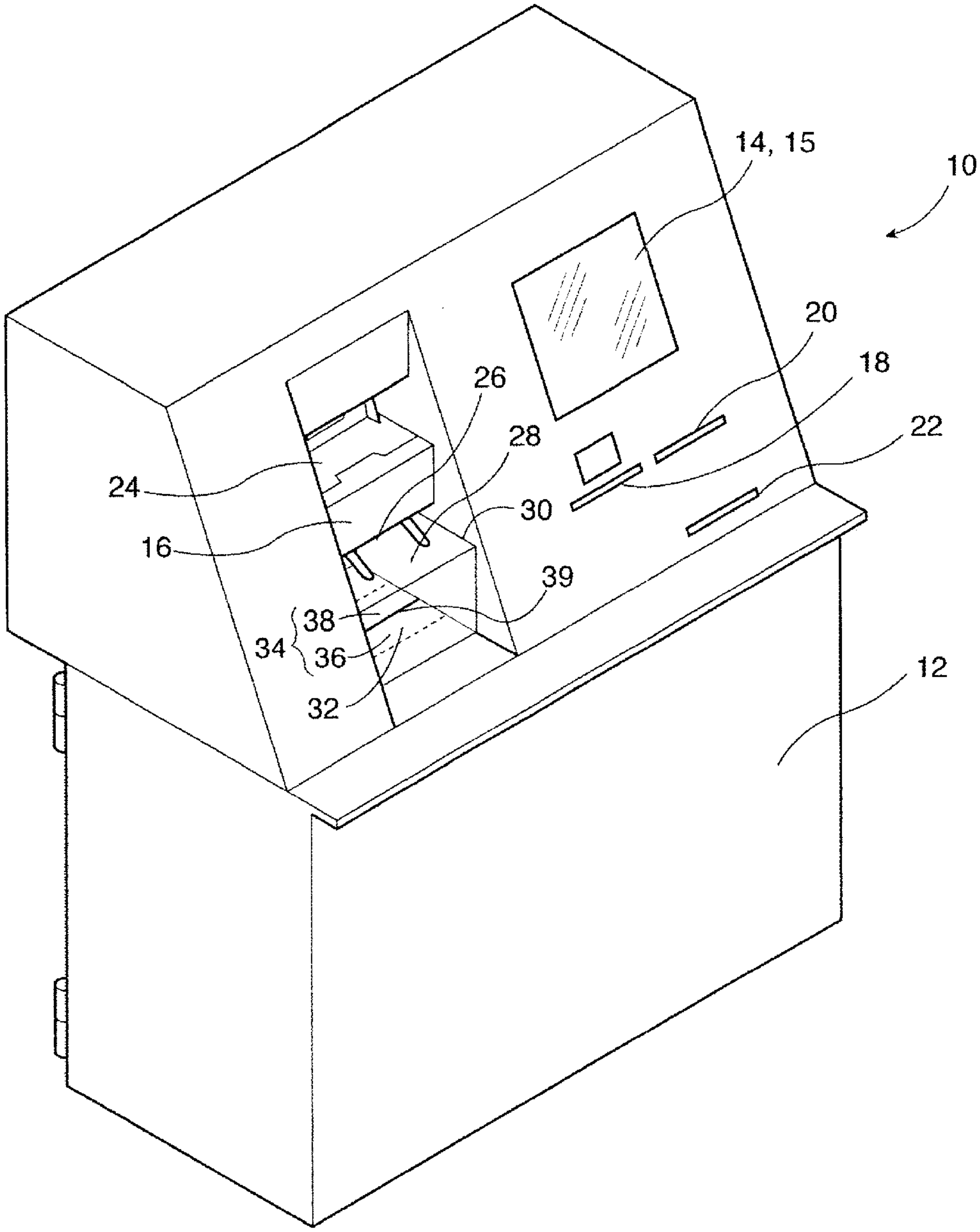
FIG. 1 is a front perspective view of the currency receiving device of the present invention.

FIG. 1 shows a front perspective view of an apparatus or device comprising the currency receiving device of the present invention. The device is generally indicated with reference numeral 10. As will be discussed in greater detail, the device 10 functions to receive and store paper currency or cash deposited by a user. The present invention also includes aspects and methods that enhance security for storing and transporting said received currency, and that improve integration of said stored currency with computerized financial and banking systems.

FIG. 1 shows as elements of the currency receiving device a storage area 12, a local processor 14 having a touch screen 15, currency counter 16, card reader 18, print receipt slot 20, and cheque slot 22. The currency counter 16 further comprises an input hopper 24, reject tray 26, and an escrow bin 28 having a lockable housing 30. The local processor 14 is preferably a personal computer (PC) having a touch sensitive screen, or "touch screen". While a conventional type screen may also be used, it can be appreciated that a touch screen has the benefit of reducing the need for a keyboard and its associated complication and expense.

A transfer slot or currency receiving opening 32 is shown bounded by dotted lines on the bottom surface of the escrow bin 28, thereby providing a passageway from the escrow bin 28 into the storage area 12. An access gate 34 having a front slider 36 and a rear slider 38 is positioned underneath said currency receiving opening 32, on a top surface inside storage area 12. Access gate 34 has an open position in which the front slider 36 and rear slider 38 are substantially apart, thereby exposing currency receiving opening 32. As shown in FIG. 1, access gate 34 also has a closed position in which the front slider 34 and rear slider 36 are drawn together to form a contiguous connection 39, thereby covering or blocking the passageway provided by currency receiving opening 32.

It may also be noted that the device 10 of the present invention preferably includes an uninterrupted power service (ups) device. If power to the device 10 is lost during a transaction, the ups device can take over and provide power to complete the transaction. Subsequently the device 10 will not accept further deposits until the power is restored.

Figure 2:
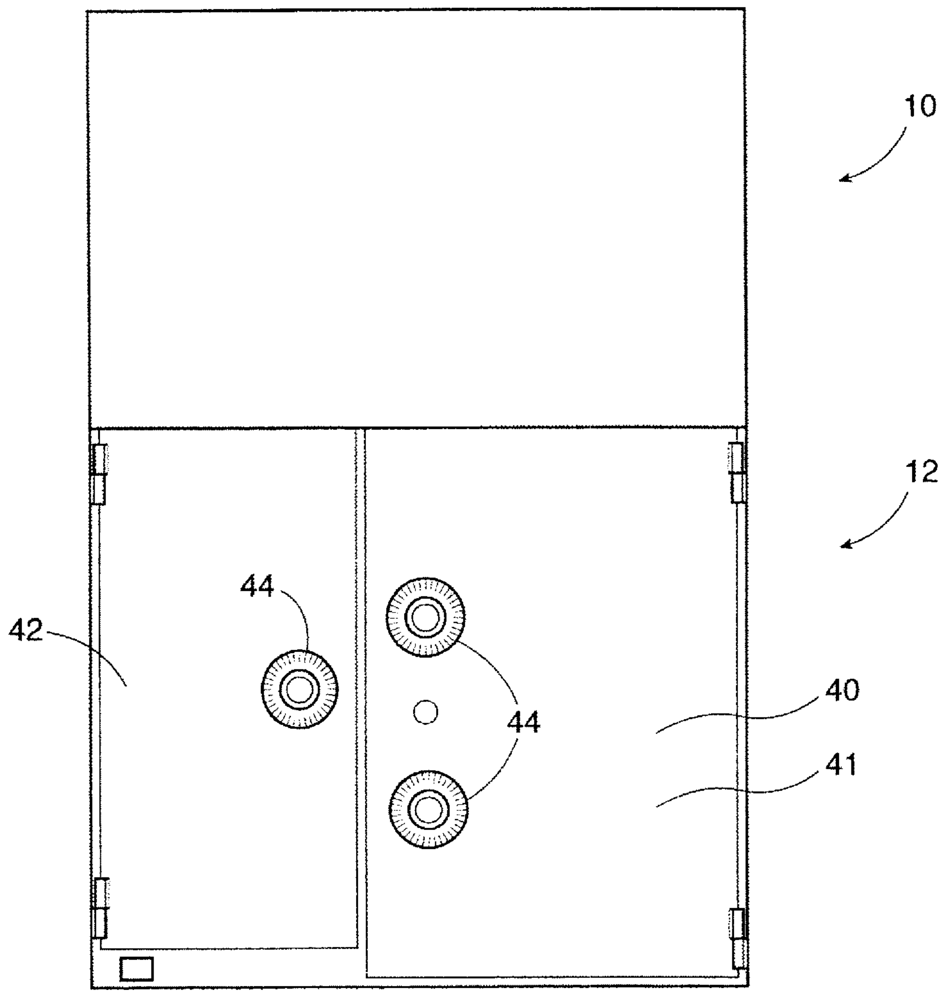
FIG. 2 is a rear view of the currency receiving device of FIG. 1.

FIG. 2 shows a rear view of the device 10, from which it may be seen that storage area 12 comprises a safe 40 for storing currency and a separate cheque safe 42 to store deposited cheques. Safe 40 has a lockable access opening or door 41. Each safe will have one or more locks 44 for security purposes. In FIG. 2 safe 40 is shown having two locks 44 for added security. It can be appreciated that the locks 44 are most commonly of the combination type, but other types of locks that provide adequate security may also be used.

Figure 3:
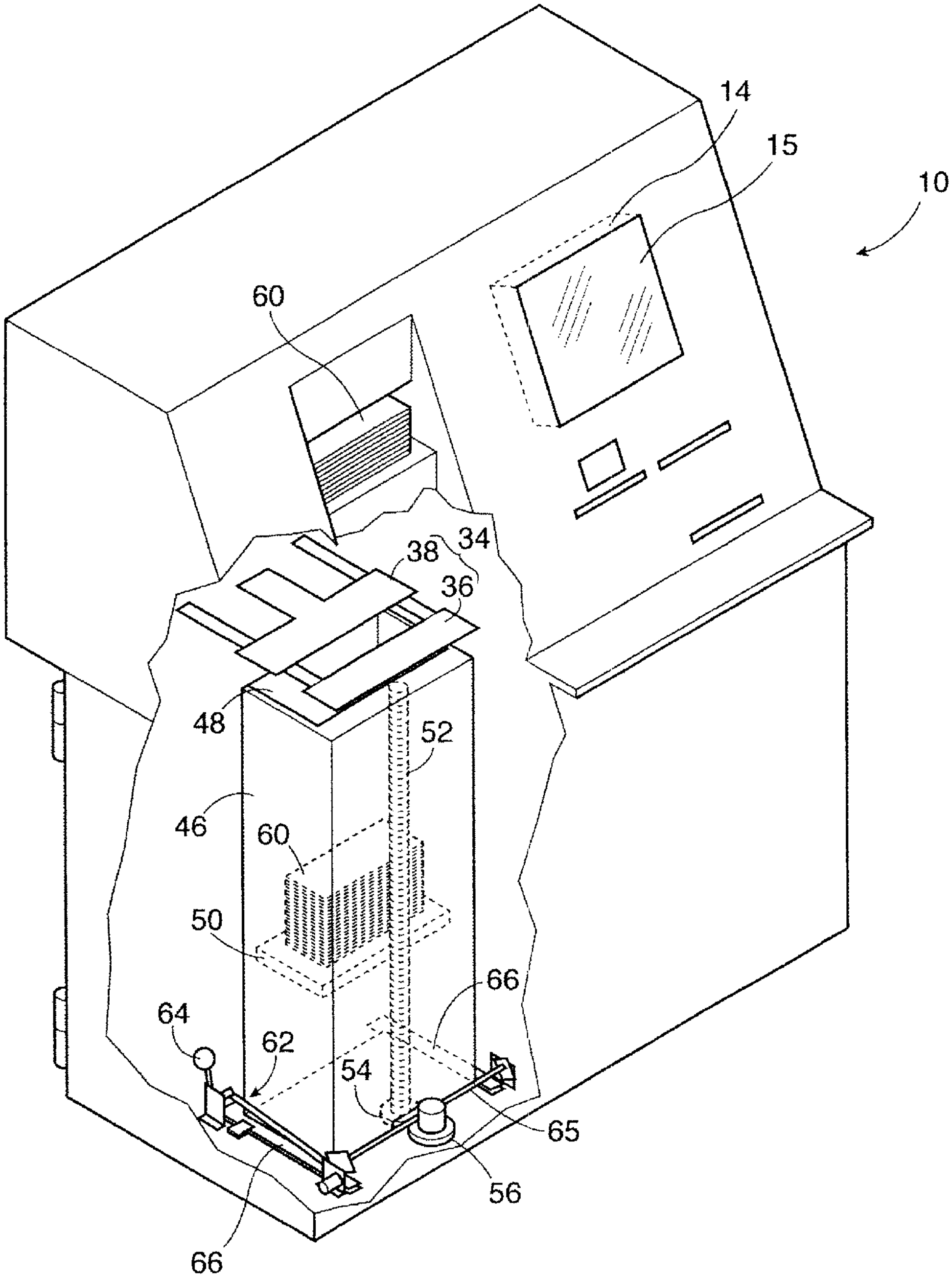
FIG. 3 is a partial cut-away view of FIG. 1, showing an internal mechanism and a currency receptacle of the currency receiving device.

FIG. 3 is a partial cut-away view of FIG. 1 showing certain internal elements of the currency receiving device 10. Access gate 34 with its component parts, the front slider 34 and rear slider 36, is now more fully shown in a partially open position. Positioned beneath access gate 34 is a removable currency receptacle or canister 46. Canister 46 is generally a rectangular container sized and shaped to receive paper currency. Said canister 46 has an access opening or open top end 48, so that when access gate 34 is open there is an unobstructed path or passageway from the bottom surface of escrow bin 28 (FIG. 1) into the interior of canister 46. Internal to canister 46 is a movable platform 50 operatively connected to a rotatable shaft 52, which attaches to a first roller 54 at the base of the shaft. First roller 54 in turn maintains a contiguous connection with a second roller 56, which is driven by a reversible electric motor 58 (not shown). A stack of paper currency or cash 60 is shown on the platform 50, and also on the input hopper 24.

Canister 46 is secured in place by a mounting device 62 located on the bottom interior surface of the device 10, inside safe 40. The mounting device 62 has among its components a locking lever 64, a backing rod 65, and two lock-arms 66. It can be seen in FIG. 3 that canister 46 is bounded on all four sides by these elements of mounting device 62. The front of the canister 46 adjoins backing rod 65, the two sides are bounded by the long sides of the two lock-arms 66, and the back of canister 46 is held on either side by hook-like projections at the end of the same lock-arms 66. As will be shown in greater detail below, backing rod 65 is fixed in place, and lock-arms 66 may be locked into the above position upon rotation of locking lever 64 and activation of a separate lock mechanism. Accordingly, in the locked position shown canister 46 is effectively secured. This also has the benefit of positioning canister 46 so that the open end 48 is directly below currency receiving opening 32, where it can most conveniently receive deposits of currency 60 from the escrow bin 28. Additionally, securing the canister 46 has the benefit of deterring unauthorized attempts to remove the canister 46, particularly when lockable access door 41 is open. Yet a further benefit provided by mounting device 62 is that it enables an electrical connection to be made between canister 46 and an electronic control box (not shown), as will be discussed in greater detail below.

In order to provide adequate security for the currency being stored, the body or outer shell of the currency receiving device 10 is preferably constructed from heavy gauge steel. It can also be appreciated that other materials that provide adequate security and protection may also be used. In particular, the safe 40 and cheque safe 42 are preferably constructed from the type of steel or other materials commonly used to construct safes, and that are generally well known to those skilled in the art.

In its preferred embodiment device 10 is approximately 54 inches high, 35 inches wide, and 29 inches deep. The canister 46 is approximately 29½ inches high, 8¾ inches wide and 5¼ inches deep. For this height dimension the canister 46 has a capacity of about 3,500 currency notes. These dimensions of the device 10 have been found to be adequate in that they provide sufficient space in which to install the various component elements such as the currency counter 16 and local processor 14. As well, in this embodiment the touch screen 15 is positioned at a height of about 48 inches, which is a convenient height for viewing by most users. Further, it may be noted that the height of canister 46, at 29½ inches, leaves a narrow gap of about two inches with the top of the storage area 12, or safe 40. This relatively narrow clearance or gap has the benefit of limiting the ability of a person to reach into the canister's open end 48 to misappropriate the cash contents. Of course it can also be appreciated that other dimensions of the device 10 and canister 46 may also be used that would provide adequate results.

An overview of the operation of an individual currency receiving device 10 to receive a deposit may now be shown. A user of the device will generally be initially issued a magnetically encoded card and a personal identification (PIN) number. The user begins the deposit by swiping the card through the card reader 18 and, when the card is recognized as described further below, be prompted for a PIN number. The user then enters the PIN number by touching the designated characters displayed on the touch screen 15. Upon the PIN number being checked and accepted the device enters into a deposit dialogue with the user. It can be appreciated that other measures than a magnetic card and pin number may also be used to identify the user, as long as an acceptable level of security is provided. For example, systems based on fingerprint or eye identification may also be used, particularly when those technologies become sufficiently advanced.

Through instructions on the touch screen 15 the user will be prompted to place the cash or currency 60 to be deposited onto the input hopper 24. The deposit could be a single bill or currency note, but is more typically a stack of such notes. Preferably, a single deposit should be limited to the maximum capacity of the escrow bin, which is generally about 200 notes. After being counted by the currency counter 16, the counted cash 60 drops into the escrow bin 28. The currency receiving opening 32 and access gate 34 are sized and shaped so that the cash that falls into the escrow bin 28 rests on the closed access gate 34, closely centered about the currency receiving opening 32. At this point the lockable housing 30 is locked so the user is not able to retrieve the cash. Any currency that is rejected for being unreadable will be placed on the reject tray 26. An instruction will appear on the touch screen 15 instructing the user to place the rejected currency in the input hopper 24 for another try.

The touch screen 15 displays the count recorded by the currency counter 16 and prompts the user whether to continue with the deposit. If the count displayed does not match the user's expectation, the user will likely select that part of the touch screen indicating the option not to proceed, whereupon the lockable housing 30 is unlocked and the user retrieves the cash. If the user selects the touch screen option to proceed with the deposit, access gate 34 will open by means of front slider 36 and rear slider 38 moving apart. The cash 60 will then fall into canister 46 through open end 48 until it comes to a rest on platform 50, or alternatively on top of a stack of currency 60 that may already be in place on platform 50 from previous deposits.

In the above procedure, the user will also be prompted to deposit any cheques into cheque slot 22, where they are retained for safekeeping in cheque safe 42. The deposited cheques are preferably bundled or enclosed in an envelope by the user prior to deposit.

In FIG. 3 platform 50 is shown at about the middle of canister 46 for illustration purposes. In practice, platform 50 will be positioned higher up at a level such that the top of the platform 50, or alternatively the top of a stack of currency 60 that may rest on the platform 50, is just below the open end 48. At this level there is preferably only a short distance of about one inch for the cash 60 to fall from its initial position at the base of escrow bin 28.

Since the notes being deposited themselves possess a certain thickness, in most cases the platform 50 will need to be further lowered so that the new, larger stack 60 on the platform 50 will fall completely within the canister 46. The platform may be lowered by activating reversible electric motor 58 (not shown) so that second roller 56 rotates. Rotating second roller 56 engages first roller 54, which in turn rotates shaft 52 such that platform 50 descends down the canister 46. As will be shown in greater detail, when the top of stack 60 drops below open end 48 the electric motor 58 is de-activated. It can also be appreciated that platform 50 may move in an upward direction by reversing the direction of electric motor 58. Upon clearing the open end 48, access gate 34 closes by bringing front slider 36 and rear slider 38 together.

Figure 4:
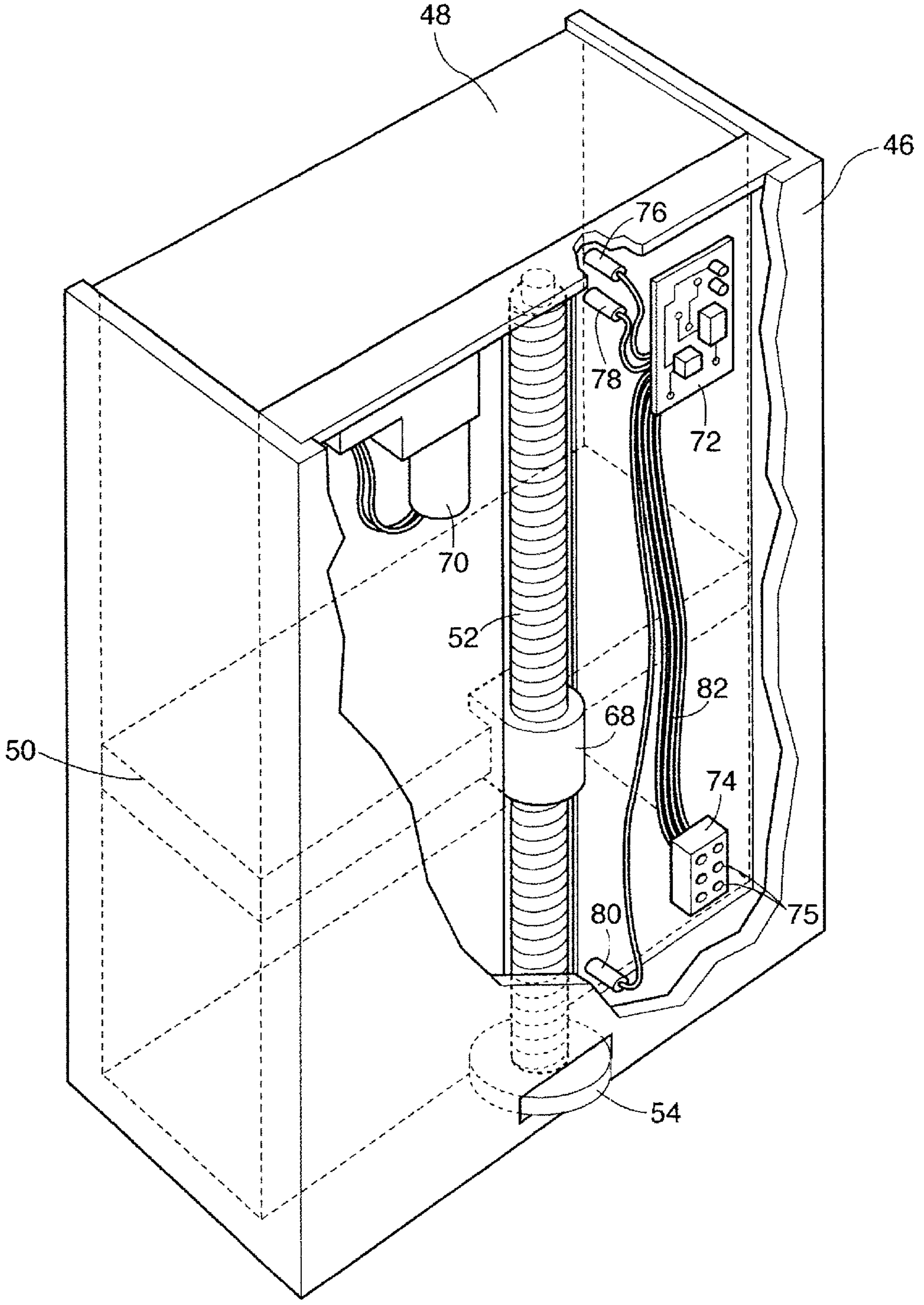
FIG. 4 is a partial cut-away view of the currency receptacle of FIG. 3, showing an internal mechanism of the currency receptacle.
Figure 5:
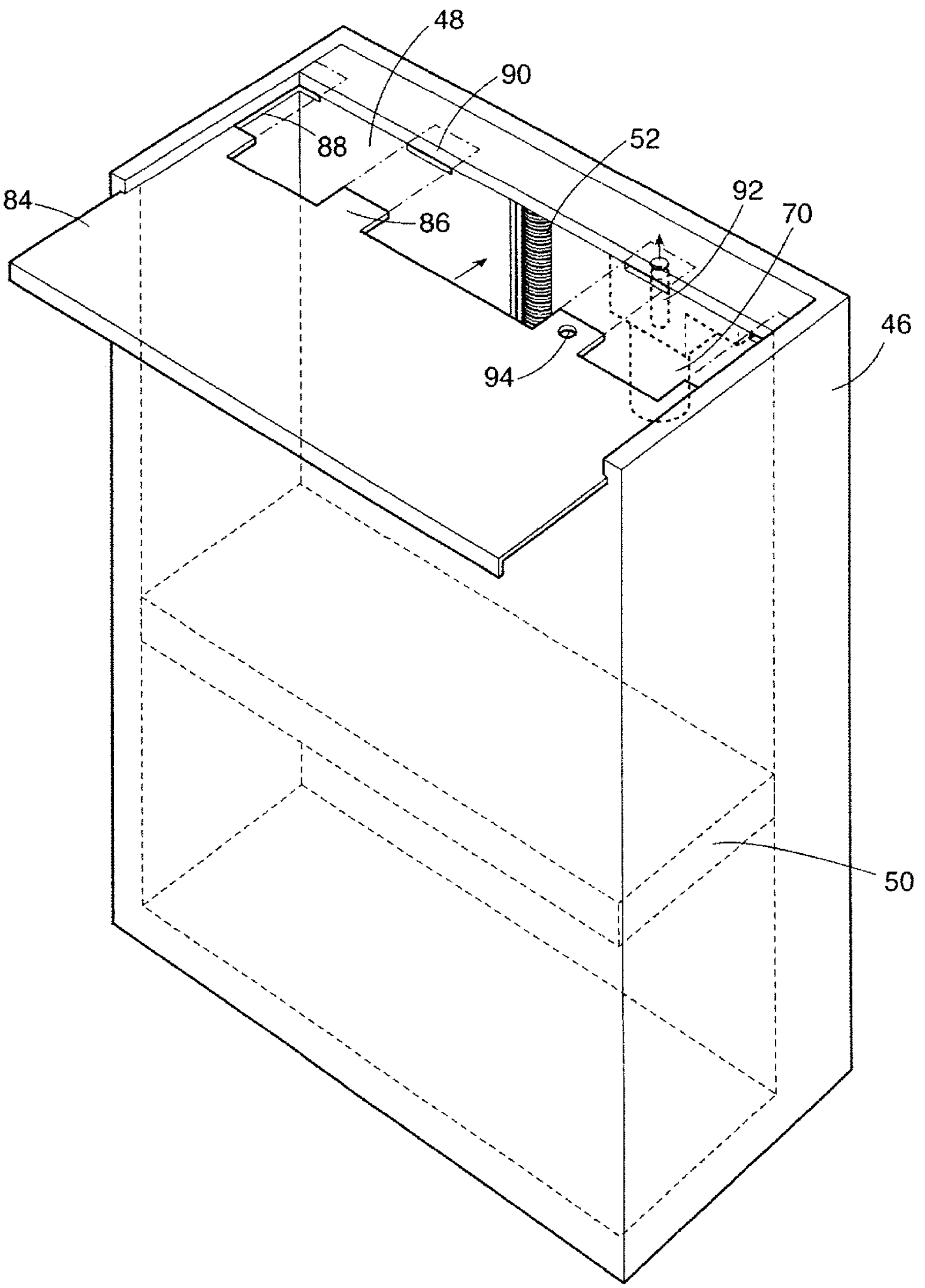
FIG. 5 is a front perspective view of the currency receptacle of FIG. 4.

Canister 46 is shown in greater detail in FIGS. 4 and 5. FIG. 4 is a cutaway rear view from which it can be seen that platform 50 occupies a larger section of the interior of canister 46, and that rotatable shaft 52 and a variety of other elements occupy a narrower section at the back of the canister 46. In the preferred embodiment of canister 46 the platform 50 is about 3½" wide, and the narrower section at the back is about 1¼" wide.

The other elements of canister 46 may now be identified. There is a mounting bracket 68 through which platform 50 attaches to rotatable shaft 52. As may be appreciated by a person skilled in the art, mounting bracket 68 has an internal thread so that said bracket rises or descends along shaft 52 as shaft 52 rotates. As bracket 68 moves up and down, platform 50 is moved along as well. The other elements shown in FIG. 4 are electrical in nature. There is a solenoid lid lock 70, an electronic or circuit board 72, a first electrical connector or contact board 74 having contact points 75, a top sensor comprising an upper rest sensor 76 and a lower rest sensor 78, and a bottom or full capacity sensor 80. In the preferred embodiment sensors 76 and 78 are electro-optical switches, and full capacity sensor 80 is a mechanical micro switch. There are also various wires 82 shown connecting the electrical elements. The contact board 74 is mounted through a hole cut out of the rear wall of canister 46. The other elements described are mounted on a backing plate (not shown) that separates these elements from the platform 50.

The various electrical elements connect electrically to circuit board 72. FIG. 4 shows wires connecting each of the sensors 76, 78, and 80 with circuit board 72, and there are also connecting wires (not shown) from solenoid 70 to circuit board 72. Circuit board 72 in turn connects through wires 82 to contact board 74, and as will be shown contact board 74 connects electrically to local processor 14 when canister 46 is installed in mounting device 62. In this way the electrical elements of canister 46 connect with local processor 14, so that canister 46 and local processor 14 can exchange information and instructions.

Sensors, 76, 78, and 80, provide the feedback information governing movement of platform 50. When a new deposit of currency is made platform 50 is lowered until currency stack 60 triggers lower rest sensor 78. This ensures that the currency stack 60 is completely within receptacle 46, and access gate 34 can be safely closed. Then, platform 50 is raised slightly until upper rest sensor 76 is triggered. At this point platform 50 is positioned fairly close, or approximately one inch in the preferred embodiment, below currency receiving opening 32, and is ready to receive the next deposit.

The present invention makes use of dual sensors 76 and 78 to reposition platform 50 to enhance reliability of the deposit. If the top bills in a stack being deposited happen to be dirty or crumpled, it is possible that a single detection sensor, for example sensor 76, might trigger prematurely. In that case access gate 34 might attempt to close while there are still some bills in the path of the currency receiving opening 32. This would create a gap between front slider 36 and rear slider 38, and possibly provide an opportunity for a person to improperly reach into canister 46.

Full capacity sensor 80 is triggered when platform 50 descends towards the bottom of canister 46, as canister 46 approaches its full capacity. It can be appreciated that sensor 80 should be set at a height somewhat above the bottom of canister 46. This is because sensor 80 is most likely to be triggered in the course of receiving a new deposit. To fully accommodate the balance of the deposit within canister 46, platform 50 may well need to continue beyond the trigger point. Otherwise, if sensor 80 is set too close to the bottom, a user who has elected to proceed with a deposit might have to be informed that the deposit cannot be accepted. Accordingly, sensor 80 should be set at a sufficient height so that the maximum expected deposit can be accommodated below the level set. Once sensor 80 is triggered, device 10 can inform subsequent users that the machine is full and cannot receive new deposits until the canister 46 is replaced.

Turning to FIG. 5, the lock mechanism of canister 46 may now be reviewed. It can be seen that canister 46 has a removable lid 84 having tabs 86. Lid 84 slides into the top or open end 48 of the canister through groove 88. Canister 46 also includes slots 90 that are sized and shaped to accept tabs 86 when lid 84 is pushed to the end of groove 88. FIGS. 4 and 5 further show that canister 46 is closed on all sides except for the top or open end 48. It can be seen from FIG. 5 that this top end may be closed by inserting and sliding lid 84 until said lid completely covers said open end 48. While lid 84 is shown as a removable element, separate from canister 46, it can be appreciated that other forms of construction are also possible as long as the lid functions to selectively open or close access to the interior of canister 46. For example, lid 84 could be attached to canister 46 through a pivot point or hinge.

In FIG. 5 solenoid lid lock 70 is hidden and shown in outline view. It can be seen from this view that solenoid 70 activates a pin 92 which moves vertically up or down as it is actuated by solenoid 70. FIG. 5 further also shows a hole 94 in one of the tabs 86.

The mechanism by which canister 46 is locked in the preferred embodiment can now be understood. After closing canister 46 by sliding lid 84 to the end so that tabs 86 engage slots 90, hole 94 will be positioned immediately above and in line with pin 92. Solenoid 70 is then activated, causing pin 92 to thrust upward so that it fills hole 94. In this position lid 84 cannot be removed as it is held in place by pin 92. It may be noted that the lock mechanism has three sensors, not shown, that feed back to circuit board 72. There is a lid-on sensor to indicate when lid 84 is fully inserted so that the tabs 86 engage the slots 90, a pin-inserted sensor to indicate when pin 92 is in hole 94, and a solenoid-on sensor to indicate when solenoid 70 is activated. The signals sent by these sensors trigger the device 10 to activate or de-activate the solenoid 70 as appropriate. Three sensors are used for the lock mechanism in the preferred embodiment to enhance security and guard against tampering. For example, if a person were to attempt to somehow push in pin 92 to try to remove lid 84, this would be recognized as tampering because the solenoid-on sensor would not be off as expected. It can be appreciated that other methods of mechanically securing a cover or lid, or for achieving an electronically controlled lock, may also be used to achieve these functions of the present invention.

It can be appreciated that locking of the lid 84 could also be achieved through use of a conventional key lock, whereby turning a key would raise or lower pin 92. However, an electronic lock whereby pin 92 is electrically activated by solenoid 70 is preferred, as it enables removable canister 46 to function as a self contained, sealed unit which cannot be re-opened until solenoid 70 is re-actuated in the reverse direction. This reduces the risk of misappropriation and pilferage of the cash contents of canister 46. As will be discussed in greater detail, the electronic lock capability of canister 46 is an advantage of the present invention, particularly when canister 46 needs to be removed from device 10 and transported to a bank depository.

Figure 6:
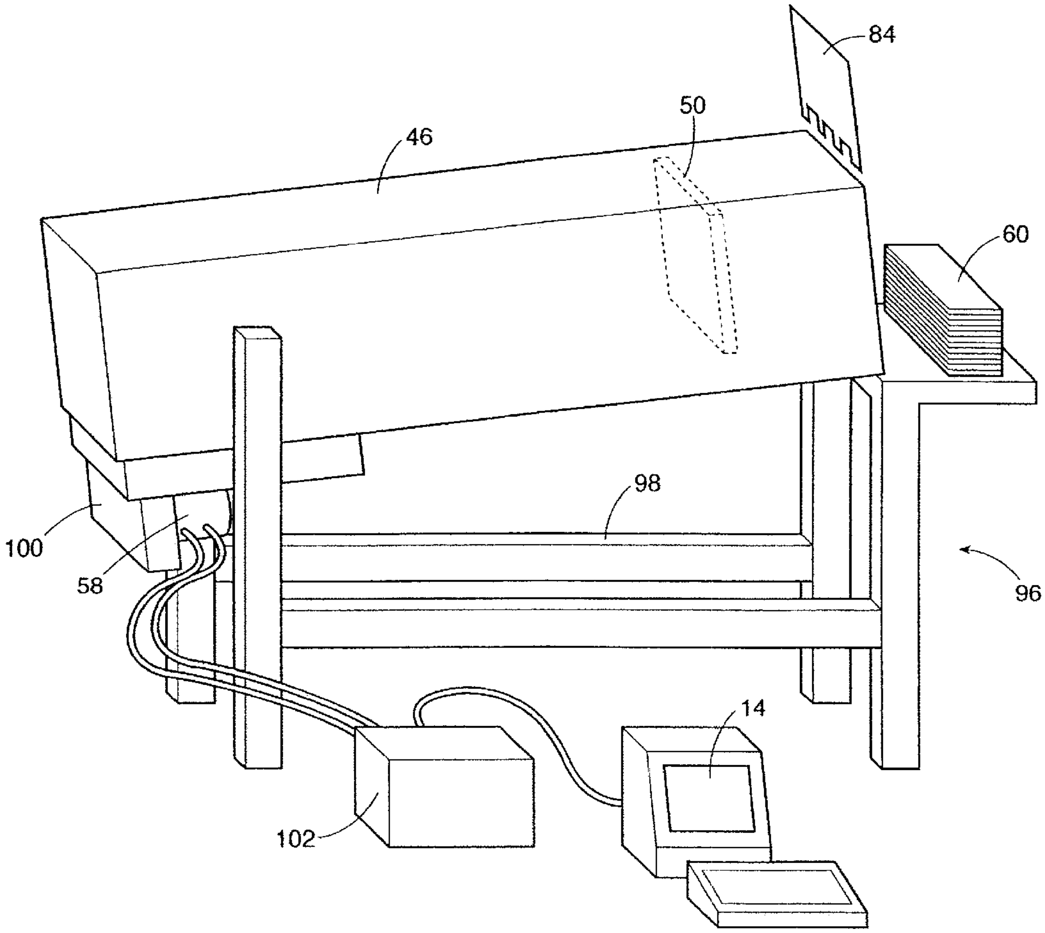
FIG. 6 is a perspective view of an unloading station, showing the currency receptacle of FIG. 3 being unloaded.

In order to unlock canister 46, an unloading station or device that simulates or replicates the functionality of device 10 may be used. FIG. 6 shows one functional embodiment of an unloading station 96. In this embodiment, canister 46 is mounted on a support frame 98. There is a contact board connector 104 (not shown) that provides an electrical contact to contact board 74, a duplicate second roller 56 that engages first roller 54, and a duplicate electric motor 58, which is visible in FIG. 6. A computer such as a conventional personal computer (PC) functions as local processor 14. The PC connects with a control box 102 which connects with the electric motor 58 and an electrical contact to the control board 74. The control box 102 is an element of device 10, and has additional functions that will be discussed in greater detail below.

To unload the canister 46, the PC or local processor 14 signals, through control box 102, for solenoid 70 to remove pin 92 from hole 94. Lid 84 can then be removed. Then PC 14 activates electric motor 58 to drive platform 50 towards open end 48. As platform 50 moves, its cash contents 60 spill out of canister 46, so that the cash can be collected and sorted. It can be appreciated that the software and hardware components of unloading station 96 will only be made available to an authorized user of device 10, and that unloading station 96 will include appropriate security measures such as password protection. Accordingly, currency 60 deposited inside a locked canister 46 should be reasonably secure from misappropriation except in cases of overt acts such as where the canister 46 is stolen outright and opened or broken apart by force. It can be appreciated that other embodiments of unloading station 96 may also be used. For example, the PC 14 and control box 102 might be integrated in a common housing mounted on the support frame 98.

It can be appreciated from the above discussion that circuit board 72 contains electronic circuits that receive information from sensors 76, 78, and 80, which govern movement of the platform 50, and also from the sensors associated with the lock mechanism. Circuit board 72 makes this information available to local processor 14 through the electrical connection provided by contact board 74. In addition to this functionality, circuit board 72 also contains in its on-board memory a unique identifier or electronic tag, which uniquely identifies the canister 46 in which circuit board 72 is installed. The identifier or electronic tag similarly becomes available to local processor 14 through the connection of contact board 74. As will be shown in greater detail, the identifier for a particular canister 46 may be known and used not only by local processor 14, but also by the broader system to which device 10 is attached.

It is an advantage of the present invention that the removable currency receptacle or canister 46 possesses this unique identifier. As a result of having a unique identifier, the canister 46 when removed and locked becomes not only a self-contained and sealed unit as described above, but it also becomes an identifiable unit whose location and movement may be readily tracked by automated computer means. Further, information relating to the various deposits made, such as the currency received, the denomination breakdown and the identity of the users, may be correlated with the unique identifier to optimize financial management. It can be appreciated that circuit board 72 could be designed so that the correlated deposit information could be kept on circuit board 72 itself, so that the information would travel with canister 46. However, as will be discussed below it is preferred that the correlated deposit information be kept in a more centralized location, where it can be better integrated with the owner's overall financial system.

It can also be appreciated that the unique identifier may be implemented by means other than an electronically readable tag, such as for example, a bar-code system. In many applications it is preferred to use an electronic tag rather than a bar-code. Using a bar-code requires the additional hardware of a bar-code reader, which is costly and adds further complication to the device 10. By contrast, the electronic tag is relatively easily implemented by software and firmware. Further, the electronic tag offers greater security because it is internal to the canister 46 and therefore hidden from observers. Yet another reason is that the canisters 46 are typically subjected to harsh handling in the course of their lifetime. In that environment a bar-code, which is externally displayed, may get smudged and become unreadable. Finally, the electronic tag offers possibilities for greater integration because it enables a canister to be "plugged in" to an electronic system through contact board 74. For example, the canister might be plugged in while on board a truck or other vehicle, which would enable it to be tracked while being transported. Of course, in applications where it is desired a bar-code identifier may be may be readily implemented.

The canister 46 is preferably constructed from a hard plastic material. While other materials such as sheet steel could also be used, it was found that such material can be heavy and difficult to manufacture within the desired tolerance. In particular a heavy canister can be a drawback as it makes management of the canisters particularly cumbersome and inconvenient, and accordingly may limit the number of employees available to handle the canisters at a location to those who have a certain minimum level of strength.

It has been found that a canister formed from high impact polycarbonate, such as the Lexan™ brand from the General Electric Company, produces adequate results. Another material that may be used is glass reinforced plastic. Canisters from this material are more easily manufactured by injection moulding. The canister may be made in two parts for easier insertion of internal components, and then joined by an industrial strength adhesive. Canisters made from these plastic materials are generally adequate in being reasonably lightweight while still strong and durable. They also will generally crack or break if subject to tampering. This is desirable, since if cash has been inappropriately removed from a canister it is advantageous to be aware that this has occurred.

Figure 7:
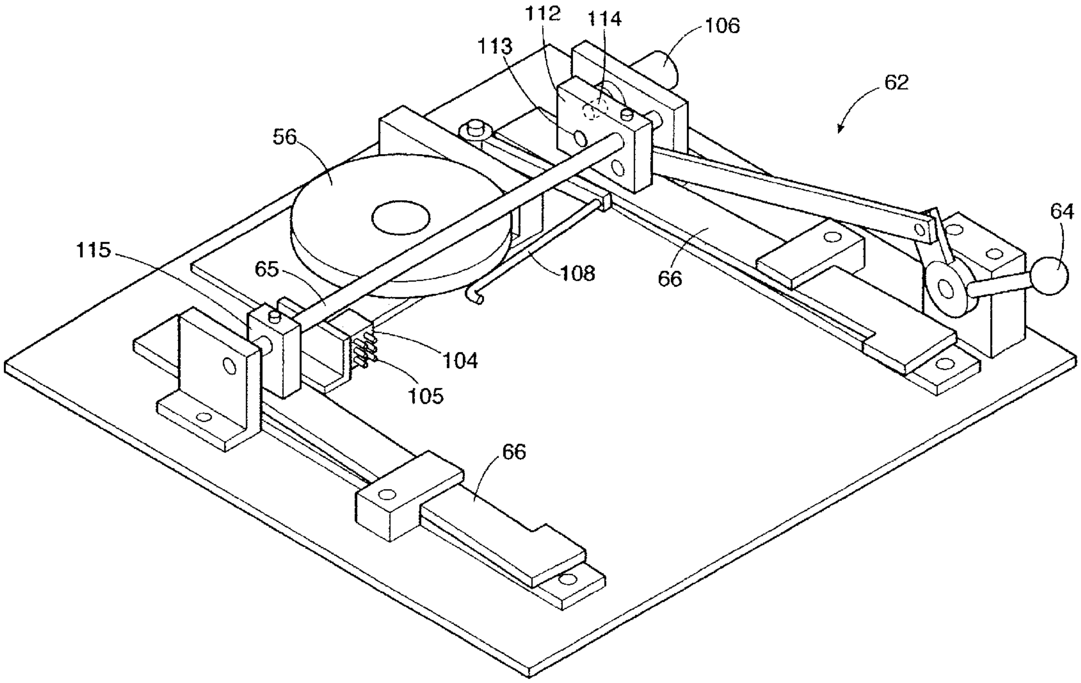
FIG. 7 is a perspective view of a mounting device, which forms part of the internal mechanism of FIG. 3.
Figure 8:
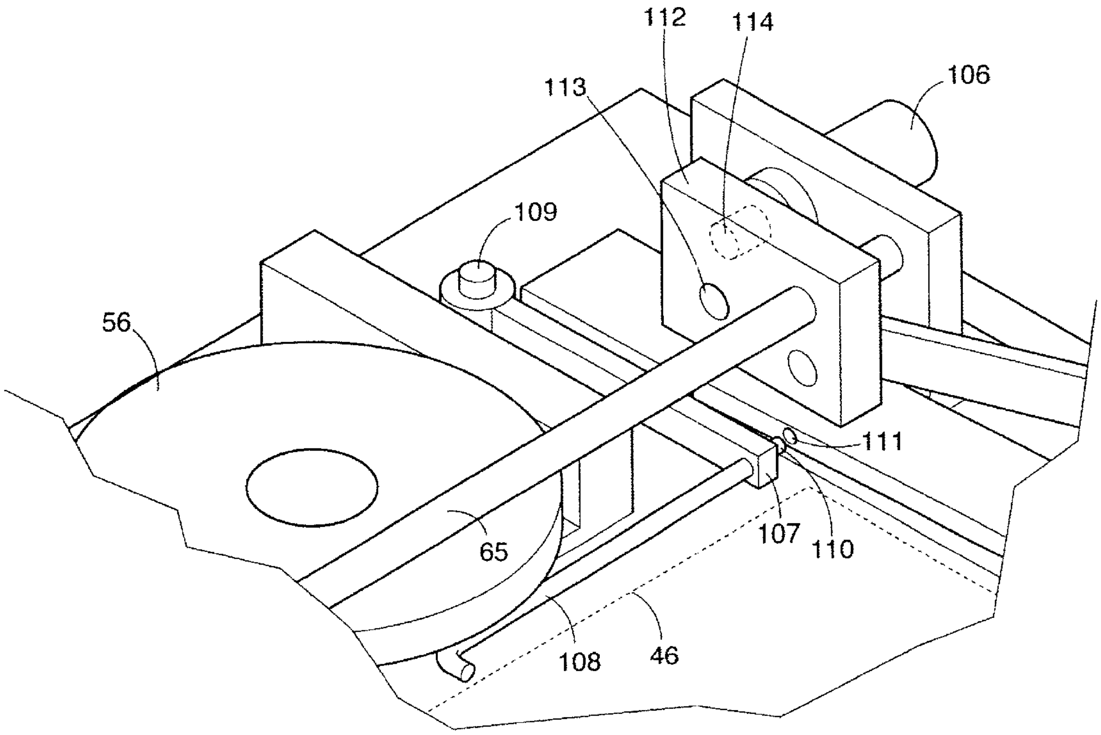
FIG. 8 is an exploded view of a section of the mounting device of FIG. 7.
Figure 9:
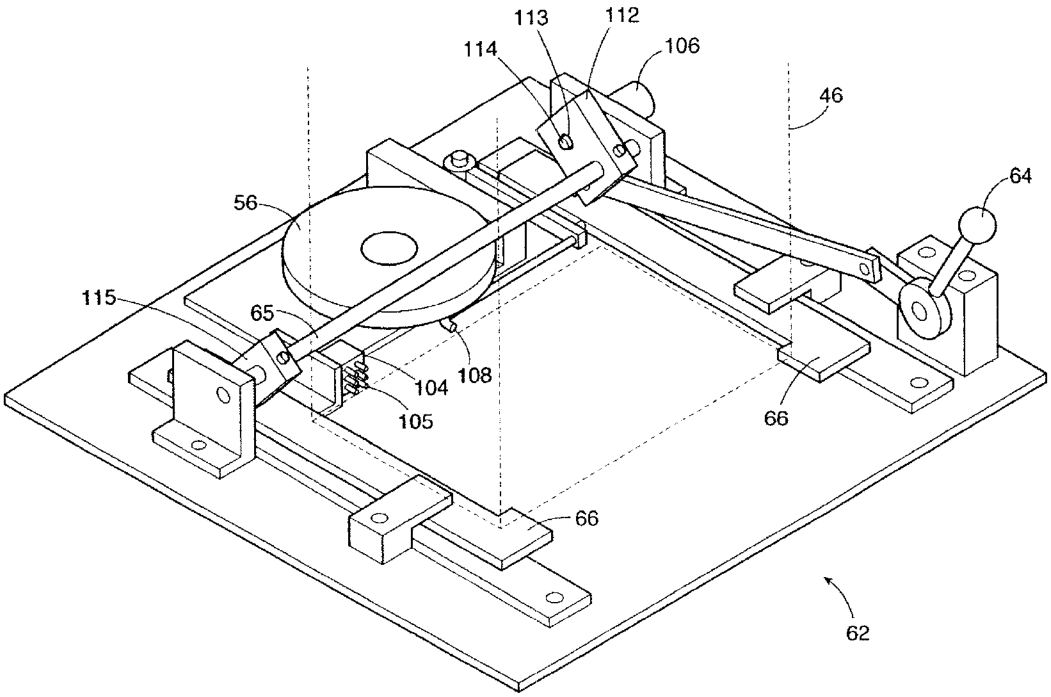
FIG. 9 is a further perspective view of the mounting device of FIG. 7, with the currency recepacle of FIG. 3 installed.

The mounting device 62 that holds canister 46 in place is shown in more detail in FIGS. 7–9. FIG. 7 shows mounting device 62 in an initial position prior to insertion of canister 46. Some of the elements described earlier in FIG. 3 may now be seen in more detail, including second roller 56 (on which is mounted electric motor 58, not shown), locking lever 64, backing rod 65, and the two lock-arms 66. From this view it can be seen more clearly that lock-arms 66 comprise a straight rod with a short hook at an outer end. It can also be seen that in this position lock-arms 66 flare out to the side slightly. This widens the space between the outer edges of the two lock-arms 66 so that canister 46 may be more easily inserted.

Further key elements of the mounting device 62 shown in FIG. 7 include a second electrical connector or contact board connector 104 having contact pins 105, solenoid lock 106, and insertion rod 108. There is a junction block 112 having a hole 113 adjacent to solenoid lock 106. Hole 113 is sized and shaped to accept a projection rod 114 (hidden from view, shown in outline) thrust by solenoid lock 106. In FIG. 7, solenoid lock 106 is not activated, and projection rod 114 is not aligned with hole 113. There is also a second junction block 115 that connects backing rod 65 to the other lock-arm 66. Through the connection provided by backing rod 65 and the two junction boxes, the lock-arms 66 located on opposite sides of mounting device 62 are configured to move in unison.

Contact board connector 104 is sized and shaped so that when canister 46 is installed, contact pins 105 establish a secure physical and electrical connection with contact points 75 of contact board 74 attached to the canister 46. In the preferred embodiment contact points 75 are female and contact pins 105 are male, since handling of canister 46 might cause male contacts to break. It can be appreciated however that this setup could be reversed if desired, and that other types of electrical connectors could also be used.

FIG. 8 shows the area surrounding insertion rod 108 in greater detail. It can be seen that insertion rod 108 is a straight rod with a short hook at the outer end. Insertion rod 108 is itself fixedly connected to connecting rod 107, which rotates about hinge 109. It can also be seen in FIG. 8 that there is a relatively short projecting pin 110 extending from the other side of connecting rod 107, and a hole 111 in the adjacent lock-arm 66. Hole 111 is sized and shaped to accept insertion of projecting pin 110. Hinge 109 is biased so that connecting rod 107, with attached insertion rod 108, is urged towards the adjacent lock-arm 66.

Returning to FIG. 7, it can now be seen how canister 46 is inserted into mounting device 62. In the initial position without canister 46, connecting rod 107 is urged under bias towards lock-arm 66, and projecting pin 110 is similarly urged and is inserted into hole 111. This prevents any movement of the adjacent lock-arm 66. Through the mechanical connection provided by backing rod 65 and junction box 115, the opposite side locking-arm 66 is similarly immobilized. Therefore, the two lock-arms 66 are held in 25, the flared out position, providing a wider opening to accept a canister. It may also be noted that as there is no canister in FIG. 7, there is no electrical connection with pins 105. From this the device 10 can be informed that there is no canister 46 installed, and device 10 can accordingly decline any user attempts to deposit currency. In this way the present invention avoids a problem with the prior art in which it was possible for the device to receive deposits even without the currency receptacle installed.

Returning to the close-up view of FIG. 8, insertion of canister 46 is represented by a dotted line indicating the leading edge of said canister. It can be seen that when canister 46 contacts insertion rod 108, said rod and connecting rod 107 rotate to overcome the bias on hinge 109, so that projecting pin 110 is removed from hole 111. This releases lock-arms 66 so that they can be moved.

FIG. 9 shows the mounting device 62 upon installation of the canister 46, shown in dotted outline. As noted above, canister 46 is inserted so that insertion rod 108 rotates, releasing projecting pin 110 from hole 111. Now that it is free, locking lever 64 can be rotated upward. Through the linkage mechanism shown in FIG. 9, lock-arms 66 are moved forward and drawn parallel to each other, forming a snug fit around the edges of canister 46. Lock-arms 66 closely fit the two sides of the canister 46, and also grip the back of canister 46 on either side with their hook-shaped outer edges. Further, as canister 46 is gripped it is pushed forward so that contact board 74 makes a secure physical and electrical connection with contact board connector 104. In this installed position, canister 46 is positioned so that its top, or open end 48, is directly below currency receiving opening 32 and access gate 34. Additionally, upon installation the first roller 54 located in canister 46 is impressed into contiguous contact with second roller 56 located as part of the mounting device 62. To facilitate this contact, electric motor 58 and its attached second roller 56 are preferably spring mounted. The spring mounting provides some margin or room for the second roller 56 to accommodate the first roller 54, and also provides a measured pressure or bias between the rollers to help ensure that rotation of second roller 56 will effectively rotate first roller 54.

Finally, FIG. 9 also shows that as locking-arms 66 have moved forward junction box 112 has rotated so that hole 113 is now in alignment with projecting rod 114. Solenoid lock 106 is actuated so that projecting rod 114 thrusts forward into hole 113. This locks locking-arms 66 so they cannot be moved, and similarly locks canister 46 in place so it cannot be removed from device 10. It is an advantage of the present invention that solenoid-lock 106 is electronically controlled by device 10, because in that way canister 46 cannot be removed until device 10 is satisfied that proper canister removal security and procedures are being followed. This would include, for example, not releasing solenoid-lock 106 unless lid 84 is on and locked.

It can be appreciated that mounting device 62 offers a number of advantages over the prior art. It enables device 10 to know when the canister is installed, so that currency does not fall loosely in the safe. It locks the canister 46 so that it cannot be removed without authorization or unless lid 84 is on and locked. It further holds the canister 46 more firmly and in the proper position, so that the transfer of currency from the currency counter 16 and escrow bin 28 proceeds more smoothly. Through its connection with circuit board 72, it makes possible the canister electronic lock and unique identifier function.

Figure 10:
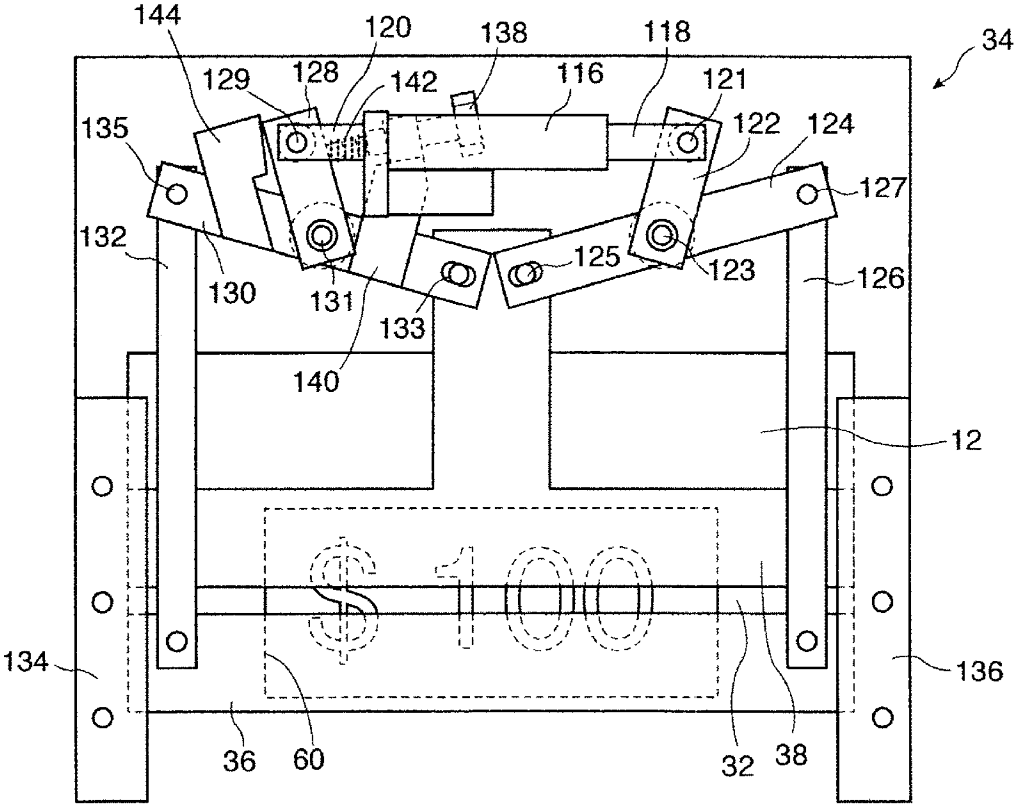
FIG. 10 is a top view of an access gate, which forms part of the internal mechanism of FIG. 3.

Turning now to FIG. 10, a more detailed view of the access gate 34 is provided. FIG. 10 is a plan view of access gate 34, when viewed from underneath, within safe 40. Accordingly, currency note or stack 60 is shown largely in outline, as it is largely hidden from view while resting in escrow bin 28, above access gate 34 in this view. As in FIG. 3, access gate 34 is shown partially open, in that front slider 36 and rear slider 38 are apart but not to their fullest possible separation. It can also be seen from FIG. 10 that front slider 36 and rear slider 38 slide along grooves provided by side plates 134 and 136. Said side plates are constructed to provide a low friction surface for the movement of said front and rear sliders.

FIG. 10 shows that access gate 34 has additionally an actuator 116. The actuator 116 of the preferred embodiment is a 24 volt linear actuator, having opposing arms 118 and 120, which respond mechanically to an electrical input. Accordingly, upon receipt of a 24 volt electrical input, arms 118 and 120 project forcefully outwards in opposing directions along a linear path. Electrical power can then be removed and said arms will remain in an extended position. Upon receipt of a subsequent 24 volt electrical signal, said arms 118 and 120 retract forcefully towards the body of the actuator 116 along the same linear path. Again, power can be removed and the arms will stay retracted until the next signal is received.

Access gate 34 further includes a link-arm mechanism which connects arms 118 and 120 to front slider 36 and rear slider 38 such that, when arms 118 and 120 are thrust outwards, the front and rear sliders separate thereby opening or increasing exposure of currency receiving opening 32. Similarly, when arms 118 and 120 are retracted inwards the sliders are drawn together, thereby eliminating their separation and closing currency receiving opening 32.

The link-arm mechanism is structured as follows. Actuator arm 118 connects to rod 122 at hinge 121, which in turn is fixedly connected with rod 124 at its mid-point, hinge 123. Rod 124 also contains two additional hinges at either end. There is hinge 125 which connects with rear slider 38, and hinge 127 which connects with long-rod 126. In turn, long-rod 126 connects with front slider 36. Similarly, actuator arm 120 connects to rod 128 at hinge 129, which in turn is fixedly connected with rod 130 at its mid-point, hinge 131. Rod 130 also contains two additional hinges at either end. There is hinge 133 which connects with rear slider 38, and hinge 135 which connects with long-rod 132. In turn, long-rod 132 connects with front slider 36.

It can now be appreciated how the link-arm mechanism acts to connect actuator arms 118 and 120 with the front and rear sliders. When, for example, actuator arms 118 and 120 thrust outwards, fixedly-connected rods 122 and 124 on one side, and 128 and 130 on the other side, rotate so that hinges 125 and 133 move rearward, and hinges 127 and 135, with attached long-rods 126 and 132, move forward. This in turn causes rear slider 38 to withdraw and front slider 36 to slide forward, thereby opening exposure to currency receiving slot 32. Since rods 124 and 130 each are attached to both front slider 36 and rear slider 38, the two sliders will move at approximately the same speed both when opening and when closing.

In FIG. 10 the structure of the preferred embodiment of access gate 34 further includes a knob 138 supported by a support rod 140 which is fixedly connected to rod 130. There is a spring 142 attached to knob 138 at one end and to the side of rod 128 at the other end. There is also a limit rod 144 fixedly attached to rod 130.

The above elements regulate the extent to which front slider 36 and rear slider 38 move as the actuator is activated. On the open part of the cycle, when actuator arms 118 and 120 push out and sliders 36 and 38 move apart, limit rod 144 acts to limit the extent of movement of rod 128 so that the sliders do not move farther than necessary. The degree to which the sliders do move is preferably set in any event to be wider than the width of the currency 60, to ensure that there is ample room for the currency to fall without obstruction.

On the closing part of the cycle, when the actuator retracts arms 118 and 120, it is important that said sliders close completely so that there is no gap between them. If the actuator moves insufficiently there will be a gap. A gap would provide an opportunity for someone to reach in or pry open the sliders and extract cash from the canister 46. On the other hand, if the actuator moves more than is required to close the sliders, there will be a strain on the actuator. This could result in excessive wear and tear on the actuator, and lead to premature breakdown. However, the tolerance of a commonly used actuator may not be sufficiently exact to precisely align the movement of actuator arms 118 and 120 with the movement of the sliders. For this reason, the spring 142 is used to take up any slack. The actuator 116 is set so that on contraction it over-closes, that is, acts to move sliders 36 and 38 beyond a fully closed position. Since it is not possible for the sliders to move beyond a fully closed position, the excess load or slack is taken up by the spring 142. In this way the sliders 36 and 38 are able to repeatedly move to a fully closed position, leaving no gap, and at the same time present no excess strain on the actuator 116.

Finally, it may be noted that in the preferred embodiment of the access gate 34 there is a sensor (not shown) to detect when access gate 34 is open. This sensor is useful to alert device 10 if someone is attempting to pry open the front slider 36 and rear slider 38, since the sensor should only detect opening when actuator 116 has been activated by the device 10.

It can be appreciated that the access gate 34 of the present invention provides a number of advantages over the prior art. The access gate 34 involves a mechanism that is symmetrical, like a scissors, so that the sliders 36 and 38 each move a substantially equal distance and in a substantially opposite direction whenever they are opened or closed. The access gate 34 accordingly provides smoother travel and is quicker when both opening and closing. This is particularly useful when opening, as it reduces the risk that currency 60 will get jammed or caught between the sliders. The design is relatively simple, requiring less adjustment and maintenance, and there is accordingly less wear on the actuator and other moving parts. Further, the access gate 34 as a whole is smaller, so less space is needed within the device 10.

The broader functionality of the control box 102 and local processor or PC 14 can now be appreciated. The PC 14 acts as a primary controller or processor of the device 10. A software program running on the PC 14 provides a user interface that controls interaction with the user. For example, the program prompts the user to place the deposit in the input hopper 24, informs the user of the count, and requests instructions whether to proceed with the deposit. It can be appreciated that a person skilled in the art would be familiar with the various prompts, instructions, and procedures involved in designing software for accepting user cash deposits.

In addition, the PC 14 is a primary or central controller of the various elements or peripherals of the device 10. For example, upon completion of a deposit the PC 14 directs the printer to print a receipt, which is emitted through the print receipt slot 20 and torn off by the user. Other elements directly controlled by the PC 14 include the currency counter 16, and card reader 18. The PC 14 also handles communication with the control box 102 and with outside devices, as discussed in more detail below.

The control box 102, referred to above in the discussion of the unloading station 96, functions as a secondary controller to provide a convenient electrical interface to some of the elements of the device 10, and also to offload, from the PC 14, some of the processing burden required to control those elements. Communication between the PC 14 and control box 102 in the preferred embodiment is through a standard RS-232 interface protocol. The control box 102 is generally a dedicated electronic unit that may be constructed using electronic design principles well known to persons skilled in the art.

The control box 102 has the capability to receive electrical signals, most typically from a sensor, to process that information using an on-board microprocessor, to activate various elements by sending an appropriate electrical signal, and to exchange instructions and information with the PC 14. Beginning with the safe 40, the control box 102 monitors a sensor that triggers when the lockable access door 41 of the safe 40 is open. With respect to the currency counter 16, the control box 102 monitors two micro switch sensors located inside and outside respectively of the escrow bin lockable housing 30. While in the preferred embodiment the control box 102 does not activate the counting function of the currency counter 16, as this is done by the PC 14, the control box 102 does provide a clear function which resets the currency counter 16 to zero.

With respect to the access gate 34, the control box 102 provides the signal that activates the actuator 116, causing the actuator 116 to expand outwards or collapse inwards as described earlier. The control box 102 also monitors an optoswitch sensor that keeps track of whether the front and rear sliders 36 and 38 are open. With respect to the mounting device 62, the control box 102 functions include monitoring a lever lock sensor that informs on the position of the locking lever 64, and another sensor that informs on whether the mounting device 62 is locked. Further, the control box 102 provides the electrical signals that drive the reversible electric motor 58. With respect to the canister 46, the control box 102 connects with the contact pins 105 of the contact board connector 104 located at the mounting device 62. Through this connection the control box 102 can access the circuit board 72 of the canister 46, and monitor the various sensors of the canister 46, including the lid-lock sensors and the platform control sensors 76, 78, and 80.

Accordingly, it can be appreciated that through the connections described above, the control box 102 is informed of whether the canister 46 is locked in place in the mounting device 62, whether the lid 84 of the canister 46 is on and locked, and whether the platform 50 is in position to receive a new deposit, or alternatively, unable to accept further deposits. The control box 102 can read the unique electronic tag or identifier from the circuit board 72. Through its control of the electric motor 58, the control box 102 can direct the platform 50 as necessary. It can be further appreciated that all of this information can be communicated to the PC 14 through the RS-232 interface, and utilized by the PC 14 for overall maintenance and control of the device 10.

The local processor or PC 14 is preferably a standard personal computer in a convenient touch screen embodiment running an industry standard operating system. In the preferred embodiment the Windows NT™ operating system is used, though it can be appreciated that other operating systems may also be used. As noted, the control box 102 has an on-board processor. Since this processor is not likely to be a personal computer, it is most likely to run from an operating system or program appropriate for internal control of such devices. Finally, it can be appreciated that there may be other embodiments of the device 10 in which the functions of the control box 102 are expanded or narrowed from those shown, or even where the control box 102 is not used, so that all control flows directly from the local processor.

In addition to the various internal elements of the device 10 described above, the present invention further includes a remote processor or network controller 100. The network controller 100 is a computer in active communication with device 10, or more particularly, with local processor 14 of device 10. Physically, the communication may be by any established communication means, such as telephone line, data line, or wireless ethernet. Preferably the network controller 100 runs on the same operating system as PC 14, so that network communication is facilitated.

The network controller 100 fulfills functions relating to administration of client or depositor accounts and also relating to monitoring of device status. The administration related software of the network controller 100 maintains or has ready access to a database containing such financial and security material as customer identification, account balances, and authorized PIN numbers and magnetic card codes. Further, as will be discussed in greater detail, the network controller 100 is informed and keeps track of deposit information at each device 10 by correlating said deposit information with the unique identifier or electronic tag associated with each canister 46.

The monitoring function software of the network controller 100 receives and processes a stream of information from the device 10 relating to the status of device 10. This includes such information as whether lockable access door 41 of safe 40 is open or closed, whether a canister 46 is installed and ready to accept deposits, whether canister 46 is full and needs to be replaced, and whether any elements are malfunctioning. If there is a service problem, the network controller 100 may alert or dispatch the appropriate service personnel as soon as the problem is identified. Depending on the nature of the problem, the network controller may put device 10 out of service pending repair.

Physically, the network controller 100 can be a single computer at a particular location running both the administration and the monitoring software. However, since the administration software relates primarily to banking, and the monitoring software relates primarily to machine maintenance, in practice the network controller 100 may be conveniently divided into two separate systems running at two distinct locations. In that case, the administration software would typically run on a bank computer, and the monitoring software would run on a service or maintenance company computer. Both systems would be networked to the device 10.

Whether it is implemented as one computer or two, the network controller 100 is integral to the operation of the device 10 of the present invention. In general, it is preferable to keep system-wide and security related information such as PIN numbers separately from the local processor or PC 14. The PC 14 is accordingly designed to run the operation of the local currency receiving device 10, and to pass on specific deposit information and the installed canister's unique identifier to the network controller 100, rather than to keep such information stored locally. This simplifies the design of the individual device 10, and enables the device operator to take a system approach. This is most practical since most users of the device 10 of the present invention will have more than one location accepting deposits, and will have a need to track a multiple number of devices 10. For example, a supermarket chain will generally have a multiple number of individual stores. Accordingly, the network controller 100 will most often control a multiple number of devices 10. In the case where there is just one device 10, a separate PC at the same location as the device 10 may be used to fulfill the functions of the network controller 100.

The PC 14 also receives local device status information, which it in turn communicates to the monitoring software of the network controller 100. The PC 14 will also receive instructions in response from the network controller 100 relating to device status, such as for example an instruction to stop accepting new deposits.

Figure 11:
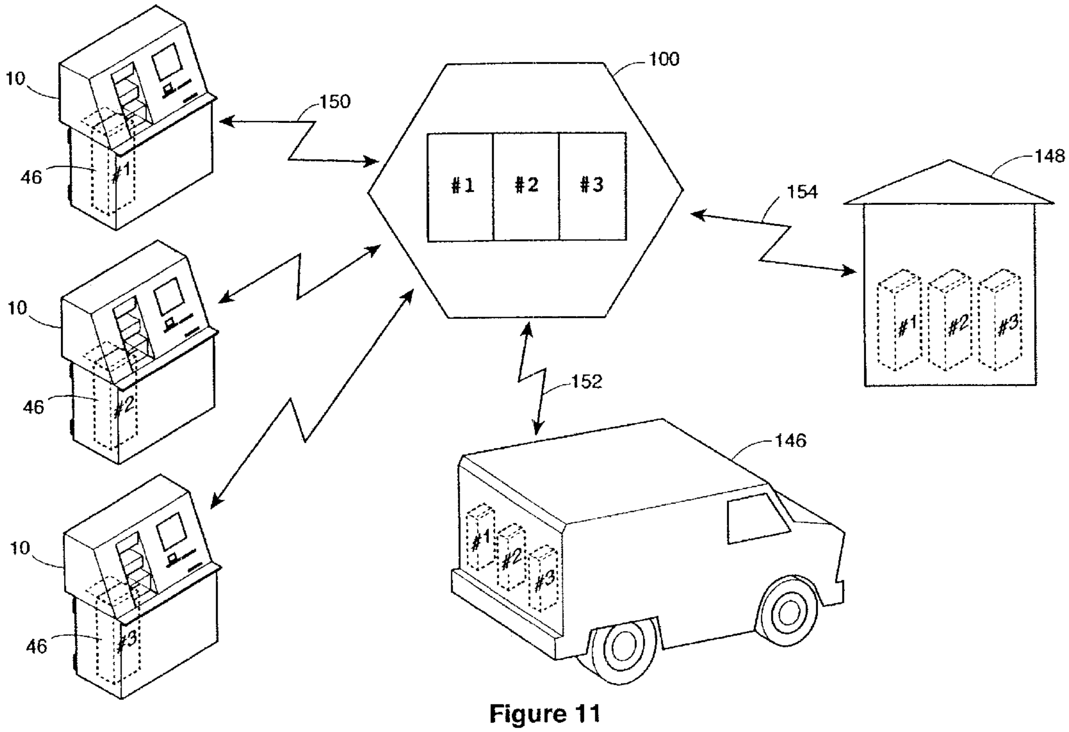
FIG. 11 is a diagram view of the currency receiving device of FIG. 1, showing three currency receptacles installed in three currency receiving devices, in transit on an armoured vehicle, and at a bank depository, while being monitored by a network controller.

As shown in FIG. 11, centralized control and tracking of deposits is made possible by the use of the unique identifier or electronic tag of the present invention. FIG. 11 shows the network controller 100 networked to three currency receiving devices of the present invention, each having an installed canister with unique identifiers "#1", "#2" and "#3" respectively. The three devices may represent, for example, three customer retail outlets disparately located in an urban area. When each of the canisters 46 is first installed, the local processors 14 at each device 10 inform the network controller 100 that a canister 46 having a particular electronic tag is installed. Accordingly, as shown the network controller 100 has in its storage or memory each of the unique identifiers, as well as related information such as store location. Subsequently when each canister 46 is removed and transported, generally by armoured vehicle 146 to a bank depository 148, the network controller can track the canisters as long as communication channels are available with the vehicle 146 and bank depository 148. The bank depository 148 represents a secure location with financial or currency processing capability that is operated by a bank or financial institution where the owner of the deposited currency maintains an account.

The full cycle of operation of the present invention, from customer deposit to bank acceptance, can now be appreciated. In a system consisting of a network controller 100 networked to a multiple number of currency receiving devices 10, a security person or guard approaches a device 10 at a particular location to install an empty canister 46. The guard swipes his or her card through the card reader 18, enters a PIN number, and informs the local processor 14, through touch prompts on a touch screen, that he or she wishes to remove the currently installed canister 46 and install a new, empty canister 46. The local processor communicates the card and PIN number information to the network controller 100, and waits to receive confirmation that the guard's entries are approved. Upon receiving confirmation, the PC 14 continues with the canister installation procedure.

Upon prompting by the PC 14, the guard opens the lockable access door 41 of safe 40. The canister 46 currently installed is locked in its place in the mounting device 62, and has its lid 84 removed. The local processor 14, acting through the control box 102, is aware through sensor readings that the lid is off and accordingly will not release the solenoid lock 106. The guard therefore slides the lid 84 onto canister 46 and pushes it to its fully in position. Upon sensing this, the PC 14 activates solenoid lid lock 70 so that pin 92 engages hole 94. Again, through feedback of the locking sensors, the local processor is aware that the lid is locked, and will then release solenoid lock 106 of mounting device 62. This enables the guard to pull down locking lever 64 and remove the full canister 46 from the device 10.

The empty replacement canister 46, with its lid on and locked, can then be slid into the mounting device 62. As the locking lever 64 is pushed forward, the canister 46 is secured in position and properly aligned under the access gate 34. In particular, contact points 75 of contact board 74 are mechanically and electrically connected with the contact pins 105 of the contact board connector 104 of the mounting device 62. Acting through the control box 102, the local processor 14 senses that canister 46 is properly installed by reading the electronic tag of the new canister. It then activates the solenoid lock 106 on the mounting device 62, which locks the newly installed canister 46 in place. Then, the local processor 14 releases solenoid lid lock 70, and prompts the guard to remove the lid 84. Through the locking sensors, PC 14 knows that the lid 84 has been removed, and prompts the guard to close and lock the lockable access door 41. Through the sensor on this door, PC 14 receives confirmation that this door is locked. Finally, PC 14 communicates to the network controller 100 the unique identifier or electronic tag of the installed canister 46, and that the device is now ready to accept deposits. The PC 14 may also communicate device status information for processing by the monitoring software. The touch screen 15 display displays a notice to users that the device 10 is ready to accept deposits.

An individual user wishing to make a deposit will swipe his or her assigned card through the card reader 18 and enter their PIN number. The local processor 14 communicates this information to the network controller 100 and proceeds only after receiving confirmation that the user information is authorized. The user is then prompted to place any cheques for deposit in cheque slot 22, and cash for deposit on the input hopper 24. Then the local processor 14 activates the currency counter 16, and the counted currency, less any rejected notes, is deposited into the escrow bin 28. The lockable housing 30 is in a locked position, so the user can see the currency but not remove it. The count of currency is communicated to the PC 14 and displayed to the user, and the user is queried whether to proceed with the deposit. If the user declines, the PC 14 unlocks the lockable housing and the user retrieves the cash. Otherwise, actuator 116 of access gate 34 is activated, front slider 36 and rear slider 38 are thrust forcefully apart, and the currency falls onto platform 50, or the top of a stack of currency already present from previous deposits. The local processor 14, acting through the control box 102, activates the electric motor 58 to lower platform 50 until lower rest sensor 78 is activated. Then, actuator 116 is again activated so that sliders 36 and 38 retract forcefully, and access gate 34 is closed. The direction of electric motor 58 is reversed and platform 50 rises until the top of the stack of currency triggers upper rest sensor 76.

Next, PC 14 communicates the deposit information relating to this transaction to the network controller 100, which correlates the deposit information with the canister's unique identifier. This deposit information typically includes such information as the canister's unique identifier, identity of the user making the deposit, the total deposit value, breakdown of the bill count by denomination, and date and time of the deposit. Other useful information such as the identity of the customer and location of the device 10 may not need to be sent with the deposit information, since it may already be known to the network controller through the canister's unique identifier. The local processor or PC 14 will preferably not keep a local record of the deposit information, since as noted this unnecessarily burdens the PC 14. The PC 14 may also send device status information for processing by the monitoring software.

As noted above, from the time the canister 46 is installed the network controller 100 is informed of the canister's unique identifier or electronic tag. During the time that the canister 46 is installed in the device 10 and receives deposits, the network controller 100 is kept updated, so that at all times the network controller 100 has current information, often called the audit or audit record, of the contents and deposit records associated with an identifiable canister 46. When the canister 46 is removed from the device 10, as described above, this audit information or record remains with the network controller 100.

Returning to FIG. 11, which shows the canisters in transit from their devices 10 to the bank depository 148, as discussed the network controller 100 is able to track the canisters through the electronic tag associated with each canister, using whatever communication channels are available. In FIG. 11, the various communication channels between the elements are represented by jagged arrows. Communication lines 150 between the devices 10 and the network controller 100 represent the networked communication described above. Communication line 152 between the armoured vehicle 146 and network controller 100 represents what is most likely a wireless communication means. Communication line 154 between the bank depository and network controller 100 may similarly be a networked communication or other communication means well known to those skilled in the art.

It can now be appreciated how the electronic tag facilitates tracking of the canisters 46. As each canister 46 is loaded onto an armoured vehicle, the electronic tag might be read by a specially designed electronic interface which would communicate this information to the network controller 100, using communication lines 152. The reading might consist of plugging canister 46 into a stationary or handheld unit having a connector similar to contact board connector 104. It can be appreciated by a person skilled in the art that a variety of devices or means of communication could be designed to conveniently read and communicate the electronic tag of canister 46.

The armoured vehicle 146 might continually re-transmit its position to the network controller 100 as it goes about its pickup and delivery schedule. Further, the process of reading and communicating the electronic tags of canisters 46 in transit could be repeated at subsequent points in the delivery route, such as, for example, at an intermediate site where canisters 46 gathered from many devices 10 are dropped-off, sorted according to eventual destination, and re-loaded onto new armoured vehicles. Similarly, at the destination bank depository 148 the electronic tags could again be read and communicated, using communication lines 154, thereby confirming to the network controller 100 that the canisters 46 have safely reached their destination. The method of the present invention therefore in effect imparts, with respect to the service of transporting cash, the type of efficiency and control typically associated with modern courier services, in which the location of many packages are electronically tracked while in transit.

Further, since the canister 46 of the present invention is electronically locked while in transit, and can only be unlocked by a secured and specialized unloading station, the risk of pilferage and theft of the canister in transit is reduced. It has been described that the lid 84 of canister 46 cannot be removed until the canister 46 itself is locked in the mounting device 62. Similarly, the canister 46 cannot be removed from device 10 unless the lid 84 is first inserted and locked. Therefore, using the method of the present invention even the security personnel charged with the duty of transporting the canister 46 have minimal if any exposure to the cash contents of the canister 46. Accordingly, the present invention minimizes if not eliminates the opportunity for intervening human contact with the deposited cash.

It can now be appreciated how the present invention enables owners of high cash retail or other business outlets, including those with multiple locations, to be continually aware of both the audit record of cash received for deposit and the whereabouts of that cash, from the time of the deposit up to the point where the cash is delivered to the owner's bank. In this way the method of the present invention enables such enterprises to better track cash deposits, and thereby obtain improved financial management. It may also be possible to arrange for the bank to recognize and give some credit to the owner for the cash as soon as it is deposited in device 10 and recorded at the network controller 100, thereby reducing or eliminating financial losses due to float. When the canisters are actually delivered to the bank depository 148, a confirmation count of their contents could be made and compared to the amount originally credited.

It will be appreciated by those skilled in the art that the foregoing description was in respect of preferred embodiments and that various alterations and modifications are possible within the broad scope of the appended claims without departing from the spirit of the invention. For example, the audit information could also be stored on the canister electronic board, so that this information could be conveniently available to reading devices while the canister is in transit. Various other modifications will be apparent to those skilled in the art but are not described in any further detail herein.

I claim:

1. A currency receiving device for receiving currency from a user, comprising;

(a) a sale having a lockable access opening and a transfer slot;

(b) a local processor, operatively connected to said safe, said local processor having a user interface to communicate with the user, and being capable of communicating with a remote processor;

(c) a currency counter, operatively connected to said safe, to count the currency deposited by the user;

(d) a removable currency receptacle, removably contained within said safe, to receive currency from the currency counter and to store said currency, said removable currency receptacle having:

(i) an open and a closed position controllable by said local processor upon establishing communication with a first data port, said receptacle being operatively connected to said currency counter when said receptacle is in said open position, and said receptacle being removable from said currency receiving device when said receptacle is in said closed position, (ii) a unique identifier, and (iii) said first data port having access to said unique identifier; and (e) a mounting device contained within said safe, to secure said removable currency receptacle within said safe, said mounting device having a second data port operatively connected to both said first data port, when said receptacle is secured in said mounting device, and to said local processor, to enable communication between said removable currency receptacle and said local processor;

wherein, upon said currency receptacle being secured in said mounting device in said safe, said identifier is communicated to said local processor through said first and second data ports and correlated with said count of currency deposited by said user.

2. The currency receiving device according to claim 1, further including a remote processor which can communicate with said local processor.

3. The currency receiving device according to claim 2, wherein said local processor communicates said unique identifier to said remote processor.

4. The currency receiving device according to claim 3, wherein said count of currency deposited by said user is provided to said local processor, which in turn communicates said count of currency to said remote processor where said count of currency is correlated with said unique identifier.

5. The currency receiving device according to claim 2, wherein said user must be approved before said currency receiving device will accept said deposit of currency from said user, and wherein said local processor requests approval for said user from said remote processor, and said remote processor responds to said local processor with a communication of an approval or a rejection of said user.

6. The currency receiving device according to claim 2, wherein status information relating to said currency receiving device is provided to said local processor, which in turn communicates said status information to said remote processor.

7. The currency receiving device according to claim 6, wherein said remote processor evaluates said status information and responds to said local processor with a communication to cease accepting further deposits of currency, and wherein said remote processor also communicates a request to a service provider to provide service to said currency receiving device.

8. The currency receiving device according to claim 1, wherein said currency receptacle is available to receive or dispense currency when in said open position, said currency receptacle securely denying access to said stored currency when in said closed position.

9. The currency receiving device according to claim 8, wherein said currency receptacle further includes an openable lid and a lock, wherein said currency receptacle is in an open position when said lock is unlocked and said lid is opened, and wherein said currency receptacle is in a closed position when said lid is closed and said lock is locked.

10. The currency receiving device according to claim 9, wherein said lid has tabs, and said currency receptacle has a groove to receive said lid and slots sized and shaped to receive said tabs, wherein said lid is closed by sliding said lid in said groove until said tabs engage said slots.

11. The currency receiving device according to claim 10, wherein said currency receptacle has a movable pin and at least one of said tabs has a hole sized and shaped to receive said movable pin, wherein said currency receptacle is locked when said movable pin engages said hole.

12. The currency receiving device according to claim 11, wherein said movable pin is moved through a link mechanism actuated by a solenoid receiving an electrical signal.

13. The currency receiving device according to claim 12, wherein said currency receptacle includes a lock sensing means, to sense when said lock is locked.

14. The currency receiving device according to claim 13, wherein said lock sensing means comprises at least one of: a first sensor to detect when said tabs engage said slots, a second sensor to detect when said movable pin engages said hole, and a third sensor to detect when said solenoid is activated.

15. The currency receiving device according to claim 11, wherein said movable pin is moved through a link mechanism actuated by a key.

16. The currency receiving device according to claim 1, wherein said currency receptacle contains an access opening and a platform which moves to receive and hold said currency, said platform being operatively connected to said access opening.

17. The currency receiving device according to claim 16, wherein said platform is electrically driven.

18. The currency receiving device according to claim 17, wherein said platform is driven by a rotating shaft having a first roller operatively connected with a rotating second roller, said second roller being attached to an electric motor and rotating when said electric motor is activated.

19. The currency receiving device according to claim 18, wherein said electric motor is spring mounted to urge said second roller into operative connection with said first roller.

20. The currency receiving device according to claim 16, wherein said currency receptacle has a top sensor to detect when currency received by the moving platform is contained within the currency receptacle.

21. The currency receiving device according to claim 20, wherein said top sensor includes a higher sensor and a lower sensor, said moving platform descending until said lower sensor is cleared, said moving platform then rising until said higher sensor is triggered.

22. The currency receiving device according to claim 16, wherein said currency receptacle has a bottom sensor, to detect when said currency receptacle is nearing full capacity.

23. The currency receiving device according to claim 1, wherein said currency receptacle has an electronic board, operatively connected to said first data port, to at least store said identifier.

24. The currency receiving device according to claim 1, wherein said currency receptacle is constructed from a hard plastic material.

25. The currency receiving device according to claim 1, wherein said mounting device lockably secures and prevents unauthorized removal of said currency receptacle when said currency receptacle is installed in said currency receiving device, said currency receptacle being operatively connected to said currency counter when lockably secured to said mounting device.

26. The currency receiving device according to claim 25, wherein said second data port is sized and shaped to make electrical contact with said first data port, said second data port making electrical contact with said first data port when said currency receptacle is installed in said mounting device.

27. The currency receiving according to claim 25, wherein said mounting device includes securing rods to secure and prevent unauthorized removal of said currency receptacle when said currency receptacle is installed in said mounting device.

28. The currency receiving device according to claim 27, further including rod-locking means to lock said securing rods when said currency receptacle is installed in said mounting device.

29. The currency receiving device according to claim 28, wherein said rod-locking means is a solenoid actuated by an electrical signal.

30. The currency receiving device according to claim 1, further including an access gate for selectively opening or closing said safe, wherein currency contained in the currency counter is transferred to the currency receptacle in said safe when said safe is open.

31. The currency receiving device according to claim 30, wherein said safe is selectively opened or closed by said access gate selectively opening or closing said transfer slot in said safe.

32. The currency receiving device according to claim 31, wherein said access gate includes a front slider and a rear slider, each of said sliders having a first and a second position, wherein said transfer slot is closed when said front slider and said rear slider are in their respective first positions, and wherein said transfer slot is opened when said front slider and said rear slider are in their respective second positions.

33. The currency receiving device according to claim 32, wherein said access gate includes an actuator having an off and an on position, said actuator being operatively connected to a link-arm mechanism, said link-arm mechanism being operatively connected to said front slider and said rear slider, wherein, upon setting said actuator into said off position, said link-arm mechanism engages said front slider and said rear slider to move said sliders into their respective first positions, thereby closing said transfer slot, and wherein, upon setting said actuator into said on position, said link-arm mechanism engages said front slider and said rear slider to move said sliders into their respective second positions, thereby opening said transfer slot.

34. The currency receiving device according to claim 33, wherein said front slider and said rear slider each move a substantially equal distance and in a substantially opposite direction when said sliders move from their first position to their second position, and when said sliders move from their second position to their first position.

35. The currency receiving device according to claim 1, wherein the currency counter has a first bin to receive currency deposited by the user, and a second bin, accessible to the user and operatively connected to the transfer slot, to hold the deposited currency after said deposited currency has been counted.

36. The currency receiving device according to claim 1, wherein said local processor informs said user of the count of currency deposited, and further provides response means accessible by the user.

37. The currency receiving device according to claim 36, wherein said response means is a computer touch screen.

38. The currency receiving device according to claim 36, wherein said currency is transferred from said currency counter to said currency receptacle when said user response confirms said user's intention to complete the deposit, and wherein said currency is retrieved by said user from said currency counter when said user response confirms said user's intention not to complete the deposit.

39. The currency receiving device according to claim 1, further including a secondary controller to communicate with and receive information from said local processor, said currency counter, and said currency receptacle.

40. The currency receiving device according to claim 1, wherein said local processor is configured to enable said currency receptacle to be opened upon receiving said unique identifier from said first data port.

41. The currency receiving device according to claim 1, wherein said local processor is configured to lockably secure said currency receptacle to said mounting device upon receiving said unique identifier from said first data port.

42. The currency receiving device according to claim 41, wherein said local processor is configured to enable said currency receptacle to be opened upon said currency receptacle being lockably secured to said mounting device.

43. A method of receiving a deposit of currency from a user, said method comprising:

(a) providing a currency receiving device, comprising a safe, a local processor operatively connected to said safe, said local processor having a user interface to communicate with the user, a currency counter, operatively connected to said safe, to count the currency deposited by the user, a removable currency receptacle removably contained within said safe and having an open and a closed position controllable by said local processor upon establishing communication with a first data port, said receptacle being operatively connected to said currency counter when said receptacle is in said open position, to receive currency from the currency counter and to store said currency, said removable currency receptacle having a unique identifier and said first data port having access to said unique identifier, and a mounting device contained within said safe, to secure said removable currency receptacle within said safe, said mounting device having a second data port operatively connected to both said first data port, when said receptacle is secured in said mounting device, and to said local processor, to enable communication between said removable currency receptacle and said local processor;

(b) receiving at least one deposit of currency from said user into said currency counter and transferring said at least one deposit of currency into said currency receptacle; and (c) correlating said identifier with said count of currency deposited by said user.

44. A method of receiving a deposit of currency from a user according to claim 43, said method further including the steps of:

(a) providing a remote processor at a remote location, said remote processor being capable of communicating with said local processor of said currency receiving device; and (b) communicating said identifier of said currency receptacle to said remote processor when said currency receptacle is installed in said currency receiving device.

45. A method of receiving a deposit of currency from a user according to claim 44, said method further including the step of communicating currency deposit information from said currency receiving device to said remote processor.

46. A method of receiving a deposit of currency from a user according to claim 45, wherein said currency deposit information comprises the currency count and identity of the depositor of each currency deposit.

47. A method of receiving a deposit of currency from a user according to claim 45, wherein said currency is owned by an owner, said owner having an account at a financial institution, said remote processor being associated with said financial institution or in communication with said financial institution, and wherein said deposited currency is credited to the account of said owner at said financial institution.

48. A method of receiving a deposit of currency from a user according to claim 45, wherein said currency receptacle is available to receive or dispense currency when in said open position, said currency receptacle securely denying access to said stored currency when in said closed position, and wherein said mounting device lockably secures and prevents unauthorized removal of said removable currency receptacle, said removable currency receptacle being operatively connected to said currency counter when said removable currency receptacle is lockably secured to said mounting device.

49. A method of receiving a deposit of currency from a user according to claim 48, wherein said currency receptacle further includes an openable lid and an electronic lock, wherein said currency receptacle is in an open position when said electronic lock is unlocked and said lid is opened, and wherein said currency receptacle is in a closed position when said lid is closed and said electronic lock is locked.

50. A method of receiving a deposit of currency from a user according to claim 49, further including the steps of:

(a) unlocking and opening said lockable access opening;

(b) installing said currency receptacle inside said safe by lockably securing said currency receptacle to said mounting device;

(c) communicating said unique identifier from said first data port to said second data port and said local processor;

(d) opening said currency receptacle by said local processor sending a signal unlocking said electronic lock and opening said lid;

(e) closing and locking said lockable access opening;

(f) upon receiving said at least one deposit of currency into said currency receptacle, unlocking and opening said lockable access opening;

(g) closing said currency receptacle by closing said lid and said local processor sending a signal locking said electronic lock;

(h) removing said currency receptacle from said safe;

(i) transporting said currency receptacle to a secure location;

(j) opening said currency receptacle by unlocking said electronic lock and opening said lid; and (k) dispensing said deposited currency from said currency receptacle for safekeeping at said secure location;

wherein, said currency deposited in said currency receptacle remains inaccessible to any person until said lid is opened at said secure location.

51. A method of receiving a deposit of currency from a user according to claim 50, wherein said step of transporting said currency receptacle from said currency receiving device to said secure location is by transportation means, said transportation means being able to communicate with said remote processor, said method further including the step of:

(a) communicating said identifier of said currency receptacle to said remote processor at least once while said currency receptacle is being transported from said currency receiving device to said secure location.

52. A method of receiving a deposit of currency from a user according to claim 51, wherein said transportation means communicates with said remote processor by wireless communication means.

53. A method of receiving a deposit of currency from a user according to claim 50, said method further including the steps of:

(a) providing a financial processor at said secure location, said financial processor being in a state of communication with said remote processor; and (b) communicating said identifier and said currency deposit information to said financial processor, when said currency receptacle is installed in said currency receiving device.

54. A method of receiving a deposit of currency from a user according to claim 53, wherein said currency is owned by an owner, said owner having an account at a financial institution, said secure location being associated with said financial institution, and wherein said deposited currency is credited to the account of said owner at said financial institution when said currency deposit information is communicated from said remote processor to said financial processor.

55. A method of receiving a deposit of currency from a user according to claim 54, said method further including the steps of:

(a) obtaining a confirmation count by counting said deposited currency dispensed from said currency receptacle when said currency receptacle is received at said secure location; and (b) comparing said confirmation count with the count of currency previously credited to the account of said owner at said financial institution.

56. A method of receiving a deposit of currency from a user according to claim 44, said method further including the step of communicating currency receiving device status information to said remote processor.

57. A method of receiving a deposit of currency from a user according to claim 56, wherein said currency receiving device status information comprises information identifying whether the lockable access opening is open or closed, and information identifying whether the currency receptacle is in an open or closed position.

58. A method of receiving a deposit of currency from a user according to claim 44, wherein said remote processor is capable of communicating with a plurality of currency receiving devices.

59. A method of receiving a deposit of currency from a user according to claim 43, wherein said remote processor is capable of communicating with a plurality of currency receiving devices.

* * * * *